United States Patent
Young et al.

(10) Patent No.: US 7,072,768 B1
(45) Date of Patent: Jul. 4, 2006

(54) METHOD FOR LATERALLY EXTRAPOLATING SOIL PROPERTY DATA USING SOIL SAMPLES AND SEISMIC AMPLITUDE DATA WITHIN A SEISMIC COVERAGE AREA

(76) Inventors: Alan G. Young, 2619 Hodges Bend Cir., Sugar Land, TX (US) 77479; Philippe Jeanjean, 6709 Westchester Ave., Houston, TX (US) 77005; Daniel Lee Lanier, 1600 Eldridge Pkwy. #507, Houston, TX (US) 77077; Vernon Ray Kasch, 11807 Amblewood Dr., Stafford, TX (US) 77477; John Richard Brand, 23902 River Place Dr., Katy, TX (US) 77494; William James Berger, 9341 County Rd. 413, Alvin, TX (US) 77511

( * ) Notice: Subject to any disclaimer, the term of this patent is extended or adjusted under 35 U.S.C. 154(b) by 176 days.

(21) Appl. No.: 10/836,680

(22) Filed: Apr. 30, 2004

Related U.S. Application Data

(60) Provisional application No. 60/467,731, filed on May 2, 2003.

(51) Int. Cl.
*G01V 1/00* (2006.01)
(52) U.S. Cl. ............................................. 702/14; 703/5
(58) Field of Classification Search .............. 702/1–18; 367/106, 105, 15; 703/5
See application file for complete search history.

(56) References Cited

U.S. PATENT DOCUMENTS

| | | | |
|---|---|---|---|
| 3,617,996 A * | 11/1971 | Herbert ....................... 367/105 |
| 4,679,174 A | 7/1987 | Gelfand ........................ 367/73 |
| 4,794,534 A | 12/1988 | Millheim ....................... 702/9 |
| 4,817,062 A | 3/1989 | De Buyl ....................... 367/73 |
| 4,894,807 A * | 1/1990 | Alam et al. .................... 367/15 |
| 4,972,383 A | 11/1990 | Lailly ........................... 367/73 |
| 5,297,109 A * | 3/1994 | Barksdale et al. ............ 367/106 |
| 5,321,613 A | 6/1994 | Porter ............................ 702/1 |
| 5,583,825 A | 12/1996 | Carrazzone ................... 367/31 |
| 5,638,269 A | 6/1997 | Fournier ....................... 702/14 |
| 5,681,982 A * | 10/1997 | Stoll et al. .................. 73/12.13 |
| 5,753,818 A * | 5/1998 | Mercado ....................... 73/594 |
| 5,764,515 A | 6/1998 | Guerillot ....................... 702/2 |
| 5,798,982 A | 8/1998 | He ............................... 367/73 |
| 5,838,634 A | 11/1998 | Jones ........................... 367/73 |
| 5,986,974 A | 11/1999 | Luo ............................. 367/41 |
| 5,995,906 A | 11/1999 | Doyen .......................... 702/16 |
| 6,052,651 A | 4/2000 | Fournier ....................... 702/14 |

(Continued)

*Primary Examiner*—John Barlow
*Assistant Examiner*—Victor J. Taylor
(74) *Attorney, Agent, or Firm*—Buskop Law Group, P.C.; Wendy Buskop

(57) ABSTRACT

A method for laterally extrapolating shallow soil properties using soil samples and seismic amplitude data within a seismic coverage area entails obtaining seismic amplitude data for the seismic coverage area and obtaining average soil property and soil impedance data for locations in the seismic coverage area. The seismic amplitude data is compared with the soil impedance data at locations in the seismic coverage area forming an amplitude impendence formula. The seismic amplitude data is converted to soil-calibrated impedance data using the amplitude impendence formula. The method continues by comparing an average of desired soil property and the soil impedance data at locations in the seismic coverage area forming a soil property-impendence formula. A target soil property is selected and the soil calibrated impedance data is converted to the target soil property using the soil property impendence formula. The method ends by extrapolating the target soil property over the entire seismic coverage area.

13 Claims, 1 Drawing Sheet

U.S. PATENT DOCUMENTS

| | | | |
|---|---|---|---|
| 6,302,221 B1 | 10/2001 | Hamman | 175/50 |
| 6,317,384 B1 | 11/2001 | Luo | 367/47 |
| 6,374,201 B1 | 4/2002 | Grizon | 703/10 |
| 6,397,168 B1 | 5/2002 | Plecnik | 703/2 |
| 6,430,547 B1 | 8/2002 | Busche | 707/1 |
| 6,438,273 B1 | 8/2002 | Loce | 382/296 |
| 6,522,973 B1 | 2/2003 | Tonellot | 702/16 |
| 6,674,689 B1 | 1/2004 | Dunn | 367/43 |
| 6,941,885 B1 * | 9/2005 | Zimmerman et al. | 114/294 |

\* cited by examiner

METHOD FOR LATERALLY EXTRAPOLATING SOIL PROPERTY DATA USING SOIL SAMPLES AND SEISMIC AMPLITUDE DATA WITHIN A SEISMIC COVERAGE AREA

The present application claims priority to co-pending U.S. Provisional Patent Application Ser. No. 60/467,731 filed on May 2, 2003.

FIELD

The present embodiments relate, in general, to methods for estimating and laterally extrapolating shallow soil properties using soil samples and seismic data within a seismic coverage area.

BACKGROUND

The goal of hydrocarbon exploration is to find porous and permeable geologic deposits containing high pore-space saturations of hydrocarbons, wherein saturations of hydrocarbons are under sufficient pressure to allow some mode of commercial production. Seismic techniques are commonly used to aid in the search for and evaluation of subterranean hydrocarbon deposits. A seismic prospecting operation consists of three separate stages: data acquisition, data processing, and data interpretation. The success of the operation depends on satisfactory completion of all three stages.

In the data acquisition stage, a seismic source is used to generate an acoustic impulse known as a "seismic signal" that propagates into the earth and is at least partially reflected by subsurface seismic reflectors (i.e., interfaces between underground formations having different acoustic impedances). The reflected signals, known as "seismic reflections", are detected and recorded by an array of seismic receivers located at or near the surface of the earth, in an overlying body of water, or at known depths in boreholes. The seismic energy recorded by each seismic receiver is known as a "seismic data trace."

During the data processing stage, the raw seismic data traces recorded in the data acquisition stage are refined and enhanced using a variety of procedures that depend on the nature of the geologic structure being investigated and on the characteristics of the raw data traces themselves. In general, the purpose of the data processing stage is to produce an image of the subsurface from the recorded seismic data for use during the data interpretation stage. The image is developed using theoretical and empirical models of the manner in which the seismic signals are transmitted into the earth, attenuated by subsurface strata, and reflected from geologic structures. The quality of the final product of the data processing stage is heavily dependent on the accuracy of the procedures used to process the data.

The purpose of the data interpretation stage is to determine information about the subsurface geology of the earth from the processed seismic data. The results of the data interpretation stage may be used to determine the general geologic structure of a subsurface region, to locate potential hydrocarbon reservoirs, or to guide the development of an already discovered reservoir.

Currently, three-dimensional seismic data is the preferred tool for subsurface exploration. As used herein, a "three-dimensional seismic data volume" is a three-dimensional volume of discrete x-y-z or x-y-t data points, where x and y are mutually orthogonal, horizontal directions, z is the vertical direction, and t is two-way vertical seismic signal travel time.

two-dimensional seismic data is also used extensively and is applied in the areas of shallow interpretation, hazards identification, and infrastructure design feasibility and design assessments and engineering.

A problem with acquisition of remotely sensed geophysical data, such as seismic data, is correlating, or "ground-truthing" the data to the actual soils, or stratigraphy, that the seismic data images. The present state of the art uses various methods in an attempt to calibrate seismic data to soils data.

Examples of Other technique for identifying and extracting seismic objects are taught in the following references: Dunn U.S. Pat. No. 6,674,689; Tonellot U.S. Pat. No. 6,522,973; Loce U.S. Pat. No. 6,438,273; Busche U.S. Pat. No. 6,430,547; Plecnik U.S. Pat. No. 6,397,168; Grizon U.S. Pat. No. 6,374,201; Luo U.S. Pat. No. 6,317,384; Hamman U.S. Pat. No. 6,302,221; Fournier U.S. Pat. No. 6,052,651; Doyen U.S. Pat. No. 5,995,906; Luo U.S. Pat. No. 5,986,974; Jones U.S. Pat. No. 5,838,634; He U.S. Pat. No. 5,798,982; Guerillot U.S. Pat. No. 5,764,515; Fournier U.S. Pat. No. 5,638,269; Carrazzone U.S. Pat. No. 5,583,825; Porter U.S. Pat. No. 5,321,613; Lailly U.S. Pat. No. 4,972,383; De Buyl U.S. Pat. No. 4,817,062; Millheim U.S. Pat. No. 4,794,534; and Gelfand U.S. Pat. No. 4,679,174. The prior art is these cases are hereby incorporated by reference.

A common element in many of these methods is the use of seismic inversion techniques. Present methods loosely calibrate seismic trace data to direct or indirect downhole measurements of soil properties attained while drilling using seismic inversion. In this manner, synthetic seismic traces are generated using seismic impedance that represent the soil measurements and are compared to the actual seismic trace. A number of boreholes can be compared and stratigraphy and soils are interpolated using a geologist's interpretation of the seismic data such that seismic reflections associate with borehole and soil properties are identified.

The conventional method is to obtain enough information from cores or boreholes to adequately assess the risk to specific locations of interest. In large field developments, particularly in deepwater, the collection of numerous core samples is neither economically practical nor feasible.

The need exists for a technique that uses all available existing geophysical and geotechnical data to identify the relationship between properties of point limited soils data and seismic amplitude data. The relationship should be that a qualitative value of a soil property can be empirically extrapolated to all points within the seismic amplitude dataset.

Beyond the current art, a need exists for a method to use a new empirical method to extrapolate seismic data to develop a quantitative projection of soil properties for a specified seismic area. The projection of soil properties would aid in oil and gas exploration, as well as, the ability to adequately do site hazard investigation, evaluation, design, installation, and operation of seafloor founded structures.

For example, a comparison of core shear strengths with the seismic amplitude values at each respective core location shows a very good correlation. Areas with lower seafloor amplitudes correspond to lower shear strengths (softer soils) whereas higher seafloor amplitudes similarly corresponded with higher shear strengths (stiffer soils).

The relationship identified above is possible, due to the inherent nature of the seafloor peak amplitude and the concept of seismic impedance. The seafloor is generally interpreted on three-dimensional seismic data as the first maximum positive or upward deflection (phase dependent) or peak. The seafloor peak wavelet is typically a very strong reflection when compared to the subsequent reflections below. This strength of the reflection is, ideally, a result of the large density and velocity contrast that exists across the water/sediment interface and is defined by the acoustic impedance and seismic reflection coefficient.

The amount of energy reflected from an interface between two layers having different densities and different seismic velocities is dependent upon the acoustic impedance of each represented as: $I=\rho V$; where: $I$=acoustic impedance; $\rho$=density; and $V$=seismic velocity.

The amplitude and polarity of the reflected wave relative to the incident wave depends upon the acoustic impedance of the two materials expressed as the Reflection Coefficient: $R=(12-11)/(12+11)=(\rho 2V2-\rho 1V1)/\rho 2V2+\rho 1V1)$. Where: $R$=reflection coefficient (−1 to +1); $I$=acoustic impedance; $\rho 1$=density of medium $1$; $\rho 2$=density of medium $2$; $V1$=velocity of medium $1$; and $V2$=velocity of medium $2$.

Both acoustic impedance and the amplitude of the seismic reflection at the seafloor are dependent upon the density of the two mediums. For seismic data acquired from a given area, changes in the impedance of the water column are minute and can, for most cases, be considered constant. However, variations in the acoustic impedance of shallow soils can be quite variable with large changes in velocity and density.

Thus, the variation in amplitude of the seafloor peak is strongly tied to the change in acoustic impedance of shallow soils for each seismic trace. The seafloor peak amplitude is not a measure of the seismic reflection at exactly the water/soil interface. Rather, seafloor peak amplitude is a measure of the seismic reflection controlled by the impedance of the water column and average impedance of multiple sediment interfaces over a soil thickness controlled by the tuning frequency and resultant tuning thickness of the seismic data. Thus, the seafloor peak amplitude is dependent upon the spatial variance of acoustic impedance across the depth of multiple interfaces sensed by the seafloor wavelet across the entire study area.

Impedance characteristics in the cores are a function of density and p-wave velocity, which are obtained from a multi-sensor core logger (MSCL). Each measurement of density and p-wave velocity in a core is related to the shear strength of the core at that sample location. Seismic impedance is they key factor in identifying the relationship between the seafloor peak amplitude of the seismic data and core impedance derived from MSCL measurements. This relationship can be directly exploited with this new method, without the need for seismic inversion or application of other existing methods, to laterally extrapolate the shallow soil conditions via the three-dimensional seismic coverage.

Beyond the current art, a need exists for a method to extrapolate seismic data to develop a projection of soil properties for a specified area. The projection of soil properties would aid in oil and gas exploration, as well as, the ability to safely locate anchoring points for offshore vessels.

SUMMARY

The method for extrapolating soil property data utilizes cored soil samples and seismic amplitude data. Various physical and engineering properties of core soil samples are measured using established laboratory testing methods and a multi-sensor core logging (MSCL) device. The MSCL provides measurements such that the average sonic impedance of each core can be determined. The seafloor amplitude of the seismic data is selected and extracted over the seismic coverage area. The average MSCL-derived sonic impedance of each core is plotted against the value of the seismic seafloor amplitude horizon data at each core location. The plot establishes an empirical formula for converting the seafloor amplitude horizon to soils-calibrated seismic impedance.

A specific soil property is selected for extrapolation and the average value of this property in each core is established. The average values of the soil property in the cores are plotted against the value of the MSCL-derived average sonic impedance of the cores. The plot establishes an empirical formula for converting the average core impedance to the chosen soil property. This formula is used to convert the soils-calibrated seismic impedance dataset (the relationship to average core impedance previously established by converting the seafloor seismic amplitude data to impedance) for the entire seismic coverage area.

The method results in an average value of the desired, originally point-limited, core soil property at every data point of the seismic data coverage area for which there was seismic seafloor amplitude data.

BRIEF DESCRIPTION OF THE DRAWINGS

In the detailed description of the preferred embodiments presented below, reference is made to the accompanying drawings, in which.

Figure 1:
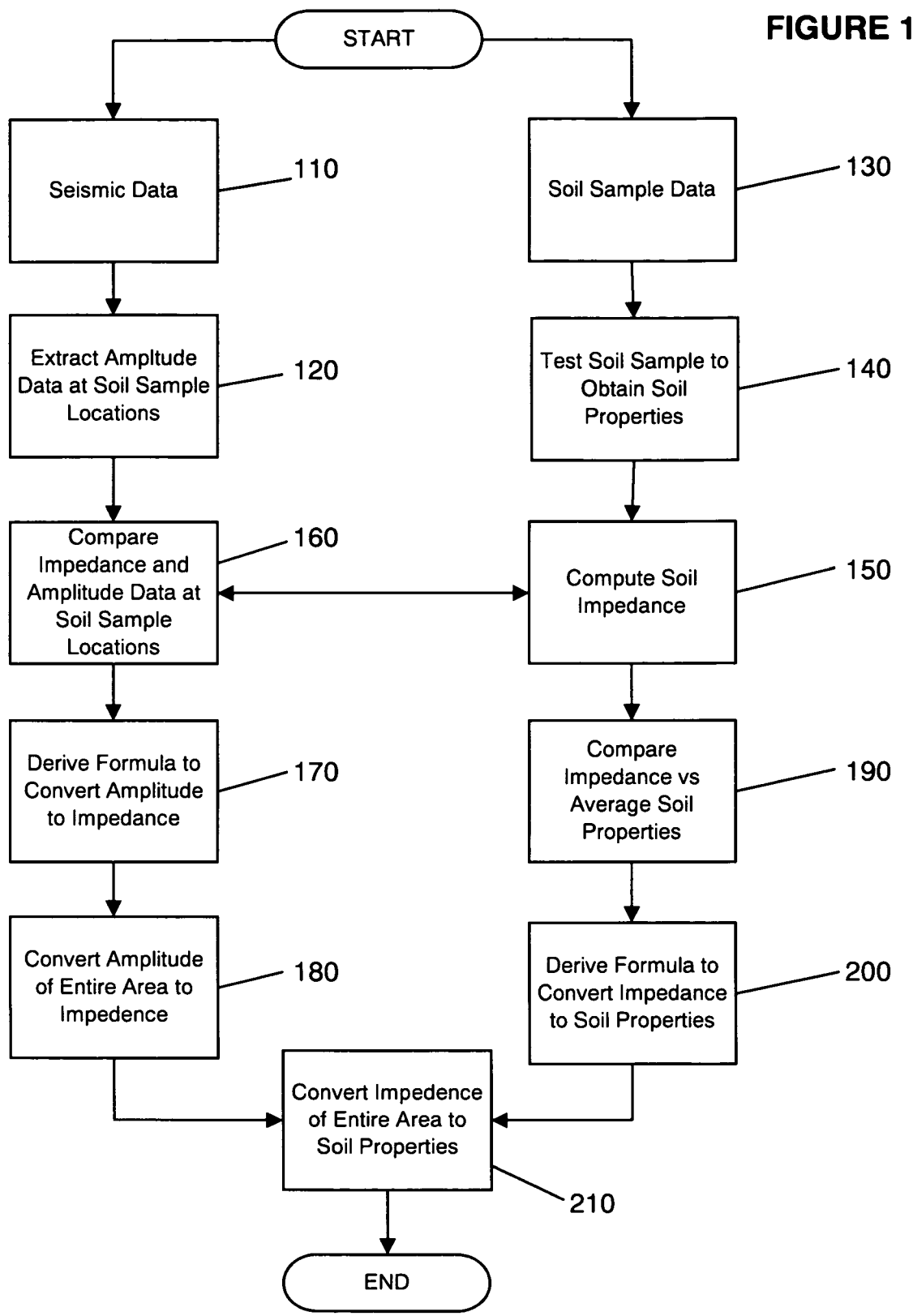
FIG. 1 depicts a schematic of an embodied method for estimating and laterally extrapolating shallow soil properties.

The present embodiments are detailed below with reference to the listed FIGURE.

DETAILED DESCRIPTION OF THE PREFERRED EMBODIMENTS

Before explaining the present embodiments in detail, it is to be understood that the embodiments are not limited to the particular descriptions and that the embodiments can be practiced or carried out in various ways.

An objective of the embodied methods is to extrapolate quantitatively an otherwise point-limited soil property to areas where soil data does not exist using both existing soil data and seismic data such that ground-truthed values of the soil property are available, in the absence of sample data, at every data point of the seismic coverage area. Another objective is to produce a data set for ground-truthed soil property data over an entire seismic coverage area to assist in geologic process interpretation, hazards evaluation, and successful engineering evaluation, design, installation, and operation of seabed or shallow founded structures.

The embodied methods are used to extrapolate point-limited soil properties using seismic amplitude data such that a value for the soil property exists at every single data point within the seismic coverage dataset. The user can, therefore, have an empirically estimated soil property within the seismic coverage area even if soil samples are not available at the specific location of interest.

The embodied methods allow for the quantitative estimation of soil properties over a broad area using seismic data. The embodied methods have great practical and economic benefit over the present practice of taking soil samples at every area of interest on the seabed.

The methods described herein are techniques for estimating and laterally extrapolating shallow soil properties using soil samples and seismic amplitude data within a seismic coverage area. The methods provide a technique to extrapolate a given soil property over an entire seismic coverage area. The extrapolated values result from an inventive technique of ground-truthing and quantitatively calibrating seismic amplitude data with soils data.

The seismic data is acquired, processed, and used to identify and extract the seafloor amplitude over the seismic coverage area.

Various physical and engineering properties of soil samples or cores are measured including measurements available from a multi-sensor core logger (MSCL). Correlations of the data collected from the soil samples are established between seismic amplitude and a desired soil property, such as soil shear strength. For example, using these correlations, the method provides a manner to extrapolate an empirically-derived estimate of soil shear strength of the seafloor and shallow sediments within the entire coverage area of the seismic data.

The methods involve using soil samples collected at locations within a seismic coverage area. The accuracy of estimating and laterally extrapolating shallow soil properties over a seismic coverage area dictated by the size of the coverage area, the resolution of the seismic data set, the bin spacing of the seismic data set, the type and number of soil sample locations collected within the area, and the depth to which these samples were taken.

The methods provide a manner to create continuous maps of the ocean floor depicting selected soil properties, such as soil shear strength. These maps, such as a soil shear strength map, are invaluable in numerous facets of petroleum exploration, hazards evaluation and mitigation, and engineering site assessment, analysis, design, installation, and performance for seabed founded infrastructure.

With reference to the FIGURE, FIG. 1 depicts a schematic of an embodied method for estimating and laterally extrapolating shallow soil properties using soil samples and seismic amplitude data within a seismic coverage area.

The initial step is to obtain seismic data for the seismic coverage area (Step 110). Seismic amplitude data is obtained by identifying and extracting the seismic amplitude data from seismic data associated with the seismic coverage area (Step 120). Seismic data can be collected from third party source or by holder.

The seismic data can be, but is not limited to, two-dimensional data, three-dimensional data, or combinations or derivatives thereof.

The method continues by obtaining cored soil sample data (cores) (Step 130). The cores are selected at various points throughout the seismic coverage area. The cores are analyzed and tested using standard laboratory testing procedures and the MSCL (Step 140). The laboratory analysis and MSCL result in a number of soil properties unique to the sediments contained in each core. Examples of soil properties can be, but are not limited to, shear strength, density, moisture content, gamma-density, p-wave velocity, or combinations or derivatives thereof. An average of the selected soil property is computed for each core using known statistical techniques.

An average of the core sonic impedance is computed for each core using known statistical techniques (Step 150).

Continuing with FIG. 1, the seismic seafloor amplitude data is compared with the average core sonic impedance at all core locations in the seismic coverage area (Step 160). The relationship between the seismic seafloor amplitude data and the core sonic impedance at various locations creates an amplitude-impedance formula (Step 170). The comparison can be done by extrapolation to create the formula or by graphing the relationship.

The seismic amplitude data is converted to soil-calibrated impedance data using the amplitude-impedance formula (Step 180). The conversion is completed for the entire coverage area.

The method continues by selecting a target soil property. Examples of target soil properties are, but are not limited to, shear strength, density, or moisture content.

Continuing with FIG. 1, the average soil property is compared to the average core soil impedance data at locations in the seismic coverage area (Step 190).

The relationship between the average soil property and the average core soil impedance data at various locations creates a soil property-core impedance formula (Step 200). Again, the comparison can be done by extrapolation to create the formula or by graphing the relationship.

The soil-calibrated impedance data is converted to the target soil property using the soil property-impedance formula (Step 210). The product is a target soil property that is extrapolated to every data point of the original seismic amplitude data for the seismic coverage area.

As an example, a core sample is tested to determine an acoustic impedance of the core sample, usually by MSCL. Each core sample from each location is measured to determine a soil property, such as shear strength. If shear strength is the selected soil property, soil shear strength can be measured with a miniature vane, a Torvane, pocket penetrometer, or tri-axial compression device, if the data is three-dimensional data. Shear strength can also be inferred from other soil properties.

The average of the measured acoustic impedance data from the core samples is correlated with the average of the measured soil shear strength to form a relationship between the acoustic core data and the soil property, such as shear strength in this example. The seismic amplitude data is correlated with acoustic impedance data to form a relationship between the seismic data and the acoustic core data. The relationships can be curves or equations.

Continuing with the example, the average soil shear strength is derived for a target area by selecting an impedance value from the amplitude impedance relationship and using the selected impedance value to identify a value in the soil property-impedance relationship. The value in the soil property impedance relationship is an average soil shear strength value for the soil core sample. The average soil shear strength values are thus mapped over the coverage area.

In an alternative embodiment, the methods can be utilized to determine sites, seafloor or sub seafloor, founded structures by determining soil properties for a target area under a body of water. Offshore vessels, such as deep draft caisson vessels, semi submersible vessels, tension leg platforms, fixed leg platforms, guided towers, anchored jackets, suction piles, jack-up rigs, and the such, need to be anchored or moored to the sea floor. Typically, the anchors for these vessels are driven piles, conventional anchors, suction piles, gravity installed piles, gravity installed anchors, drag embedment anchors, or combinations thereof. In order to anchor the vessel correctly, the properties of the soil in the seafloor and shallow subsurface should be known so a safe assessment as an anchoring location can be made. The methods herein provide the soil properties needed to make the safe assessment.

In an alternative embodiment, the methods can be utilized to determine sites and performance of seabed placed structures such as, but not limited to, manifolds, plets, plems, mud mats, skirts, pipelines, flowlines, or umbilicals.

Initially, seismic amplitude data and soil data are collected or made available in the coverage area. Soil impedance is derived from the soil data. The seismic amplitude data is compared with the soil impedance data in the coverage area. The resulting relationship is an amplitude impedance formula. The seismic amplitude data is then converted to soil calibrated impedance data using the amplitude impedance formula.

The soil shear strength information is compared to the core soil impedance data in the coverage area. The resulting relationship is a soil property impedance formula. When a particular anchoring site is targeted, the soil calibrated impedance data for the targeted anchoring site is converted to the desired soil property information. The conversion is completed using the soil property impedance formula.

Once the soil property information for the targeted anchoring site is known, an assessment can be made to determine whether the targeted anchoring site is capable of adequately anchoring a vessel. Typically, the determination is to whether the shear strength is enough to hold the anchor during a 100-year storm or even a loop eddy current in the Gulf of Mexico. The method can be used to determine if more than one anchor is needed for a target area.

The method can be used to develop a sea floor stability assessment in order to indicate areas of potential soil instability and failure.

The method can be used to assess three-dimensional underwater field architecture within a target area. Examples of underwater field architecture include Christmas trees, organizations of three or more wells, pipeline maps, and such.

The embodiments have been described in detail with particular reference to certain preferred embodiments thereof, but it will be understood that variations and modifications can be effected within the scope of the embodiments, especially to those skilled in the art.

What is claimed is:

1. A method, executed by a computer, for laterally extrapolating soil properties within a seismic coverage area, wherein the method comprises the steps of:
   a. collecting a soil impedance measurement for selected locations in a seismic coverage area;
   b. correlating the soil impedance measurement to seismic amplitude at each selected location, thereby developing an amplitude-impedance formula;
   c. applying the amplitude-impedance formula to seismic amplitude for the seismic coverage area to convert seismic amplitude to extrapolated soil impedance for the seismic coverage area;
   d. collecting a soil property measurement for selected locations in the seismic coverage area;
   e. correlating the soil property measurement to the extrapolated soil impedance at each selected location, thereby developing an soil property-impedance formula; and
   f. applying the soil property-impedance formula to the extrapolated soil impedance for the seismic coverage area to convert the extrapolated soil impedance to extrapolated soil property measurements for the seismic coverage area.

2. The method of claim 1, wherein the seismic amplitude is obtained by extracting the seismic amplitude from seismic data associated with the seismic coverage area.

3. The method of claim 2, wherein the seismic data is two-dimensional data, three-dimensional data, or combinations thereof.

4. The method of claim 1, wherein the soil property measurement and soil impedance measurement is obtained by extracting the soil property measurement and soil impedance measurement from core samples of locations in the seismic coverage area.

5. The method of claim 4, wherein the step of extracting the soil property measurement and soil impedance measurement from core samples is performed by testing the core samples.

6. The method of claim 1, wherein the soil property measurement is shear strength, density, moisture content, strength or combinations thereof.

7. The method of claim 1, further comprising the step of collecting soil samples within the seismic coverage area.

8. A method, executed by a computer, for determining anchoring sites by determining soil shear strength for a target area under a body of water, comprising the steps of:
   a. collecting a soil impedance measurement for targeted anchoring sites in a seismic coverage area;
   b. correlating the soil impedance measurement to seismic amplitude at each targeted anchoring site, thereby developing an amplitude-impedance formula;
   c. applying the amplitude-impedance formula to seismic amplitude for the seismic coverage area to convert seismic amplitude to extrapolated soil impedance for the seismic coverage area;
   d. collecting soil shear strength for the targeted anchoring sites in the seismic coverage area;
   e. correlating the soil shear strength to the extrapolated soil impedance at each targeted anchoring site, thereby developing an soil shear strength-impedance formula;
   f. applying the soil property-impedance formula to the extrapolated soil impedance for the seismic coverage area to convert the extrapolated soil impedance to extrapolated soil shear strength measurements for the seismic coverage area; and
   g. determining whether the target anchoring site comprises soil shear strength adequate to anchor the vessel.

9. The method of claim 8, wherein the vessel is a deep draft caisson vessel, a semisubmersible vessel, a tension leg platform, fixed leg platform, a guided tower, an anchored jacket, a jack-up rig, a barge, or a ship.

10. The method of claim 8, wherein the anchoring site are for a driven pile, a conventional anchor, a suction pile, a gravity installed pile, a gravity installed anchor, a drag embedment anchor, or combinations thereof.

11. The method of claim 8, wherein the anchoring sites are seabed placed structures, wherein the seabed placed structures are selected from the group consisting of manifolds, plets, plems, mud mats, skirts, pipelines, flowlines, and umbilicals.

12. A sea floor stability assessment indicating areas of potential soil stability failure created using the method of claim 1.

13. Design of underwater field architecture within a target area using the three-dimensional map created by the method of claim 1.

* * * * *